United States Patent
Deng et al.

(10) Patent No.: US 12,108,432 B2
(45) Date of Patent: Oct. 1, 2024

(54) CHANNEL QUALITY REPORTING METHOD AND APPARATUS OF DIRECT LINK, STORAGE MEDIUM, AND USER EQUIPMENT

(71) Applicant: BEIJING UNISOC COMMUNICATIONS TECHNOLOGY CO., LTD., Beijing (CN)

(72) Inventors: Yun Deng, Shanghai (CN); Xin Qu, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 404 days.

(21) Appl. No.: 17/599,359

(22) PCT Filed: Feb. 21, 2020

(86) PCT No.: PCT/CN2020/076101
§ 371 (c)(1),
(2) Date: Sep. 28, 2021

(87) PCT Pub. No.: WO2020/192320
PCT Pub. Date: Oct. 1, 2020

(65) Prior Publication Data
US 2022/0191879 A1    Jun. 16, 2022

(30) Foreign Application Priority Data
Mar. 28, 2019  (CN) .......................... 201910244723.9

(51) Int. Cl.
*H04W 72/542* (2023.01)
*H04W 72/02* (2009.01)
(Continued)

(52) U.S. Cl.
CPC ......... *H04W 72/542* (2023.01); *H04W 72/02* (2013.01); *H04W 72/0446* (2013.01); *H04W 72/0453* (2013.01)

(58) Field of Classification Search
None
See application file for complete search history.

(56) References Cited

U.S. PATENT DOCUMENTS

2015/0043475 A1*  2/2015  Kim .................... H04W 72/23
                                                      370/329
2016/0066351 A1    3/2016  Zhao et al.
(Continued)

FOREIGN PATENT DOCUMENTS

CN    103702346 A    4/2014
CN    104105088 A    10/2014
(Continued)

OTHER PUBLICATIONS

Ericsson: "On the Support of Sidelink CSI feedbacks", 3GPP Draft R2-1901659, Feb. 14, 2019 (Feb. 14, 2019).
(Continued)

*Primary Examiner* — Chi H Pham
*Assistant Examiner* — Raul Rivas
(74) *Attorney, Agent, or Firm* — Harness, Dickey & Pierce, P.L.C.

(57) ABSTRACT

A channel quality reporting method and apparatus for direct links, a storage medium, and a user equipment are provided. The channel quality reporting method includes: receiving report indication information, wherein the report indication information indicates at least one direct link that needs to be reported or a report condition; determining at least one reported direct link at least based on the report indication
(Continued)

information; and reporting channel quality of the at least one reported direct link or information of the at least one reported direct link.

18 Claims, 2 Drawing Sheets

(51) Int. Cl.
*H04W 72/0446* (2023.01)
*H04W 72/0453* (2023.01)

(56) References Cited

U.S. PATENT DOCUMENTS

| | | | |
|---|---|---|---|
| 2018/0014238 A1* | 1/2018 | Lee | H04W 36/30 |
| 2018/0084451 A1 | 3/2018 | Fukuta et al. | |
| 2019/0052436 A1 | 2/2019 | Desai et al. | |
| 2021/0037534 A1 | 2/2021 | Ji | |

FOREIGN PATENT DOCUMENTS

| | | | |
|---|---|---|---|
| CN | 108933648 A | 12/2018 | |
| CN | 109246659 A | 1/2019 | |
| CN | 110380828 A | 10/2019 | |
| CN | 110536316 A | 12/2019 | |
| EP | 3860188 A1 | 8/2021 | |
| WO | WO-2018113946 A1 * | 6/2018 | H04B 17/24 |

OTHER PUBLICATIONS

Extended European Search Report regarding EP 20776852.4, dated Nov. 25, 2022.
Samsung: "Considerations on Sidelink CSI", 3GPP Draft R1-1902279, Feb. 15, 2019 (Feb. 15, 2019).
International Search Report (in English and Chinese) and Written Opinion (in Chinese) of the International Searching Authority issued in PCT/CN2020/076101, May 22, 2020; ISA/CN.

* cited by examiner

CHANNEL QUALITY REPORTING METHOD AND APPARATUS OF DIRECT LINK, STORAGE MEDIUM, AND USER EQUIPMENT

CROSS-REFERENCE TO RELATED APPLICATIONS

This application is a National Stage of International Application No. PCT/CN2020/076101, filed on Feb. 21, 2020, which claims the priority to Chinese Application No. 201910244723.9, filed on Mar. 28, 2019, both of which are incorporated herein by reference.

TECHNICAL FIELD

The present disclosure generally relates to communication technology field, and more particularly, to a channel quality reporting method and apparatus for direct links, a storage medium, and a User Equipment (UE).

BACKGROUND

In Release 12 of a communication standard, Long Term Evolution (LTE) systems introduce direct communication. Multiple UEs can communicate directly through a PC5 interface which is a direct interface between UEs. There are two resource allocation modes, one is scheduled resource allocation which is configured by a base station through dedicated signaling, the other is automatic resource selection where a base station provides for a UE a resource pool for direct communication through system message or Radio Resource Control (RRC) signaling, and the UE selects resources for direct communication from the resource pool. If a Transmitter UE (Tx UE) is out of a network coverage, the UE adopts the automatic resource selection mode to select resources for direct communication from a pre-configured resource pool.

Based on direct communication, the 3rd Generation Partnership Project (3GPP) also supports Vehicle-to-Everything (V2X). 3GPP is studying introduction of V2X into New Radio (NR) systems. 5G systems can provide greater bandwidth and lower latency, and thus can better meet service requirements of V2X.

In NR V2X, resource allocation modes in LTE are basically reused, such as the introduction of mode 1 where the base station schedules transmission resources for V2X data for the UE, and the introduction of mode 2 where the UE determines transmission resources for V2X data, and selects the transmission resources from a resource pool configured by a network or from a pre-configured resource pool. When using mode 1, the UE needs to be in an RRC connection state. The base station schedules a transmission resource for V2X data for the UE through RRC signaling or Downlink Control Information (DCI). After receiving the scheduled resource, the UE transmits V2X data to an Rx UE (Receiver UE) through a PC5 interface in a slot applicable to the scheduled resource. In Mode 1, a Tx UE may transmit V2X data to multiple UEs simultaneously, where the Tx UE establishes unicast channels of direct links with multiple UEs. The Tx UE may provide quality information of these direct links to the base station, so that the base station reasonably schedules transmission resources for the Tx UE to adapt to channel conditions of different direct links.

SUMMARY

By embodiments of the present disclosure, channel quality of direct links may be reported effectively.

In an embodiment of the present disclosure, a channel quality reporting method for direct links is provided, including: receiving report indication information, wherein the report indication information indicates at least one direct link that needs to be reported or a report condition; determining at least one reported direct link at least based on the report indication information; and reporting channel quality of the at least one reported direct link or information of the at least one reported direct link.

In an embodiment of the present disclosure, a storage medium having computer instructions stored therein is provided, wherein when the computer instructions are executed, the above method is performed.

DETAILED DESCRIPTION

As described in the background, how to report channel quality of direct links by the Tx UE is an urgent problem to be solved.

In embodiments of the present disclosure, a UE may determine at least one reported direct link based on report indication information configured by a base station, and report to the base station channel quality of the at least one reported direct link or information of the at least one reported direct link. In this manner, the base station determines the channel quality of the at least one reported direct link of the UE. By embodiments of the present disclosure, channel quality of direct links may be reported by the UE effectively.

In the embodiments of the present disclosure, a base station (or a serving base station) refers to a base station with which a Tx UE establishes an RRC connection. The Tx UE receives merely downlink signaling of the serving base station. Therefore, the base station in the embodiments of the present disclosure refers to the serving base station of the Tx UE.

In order to clarify the objects, characteristics and advantages of the disclosure, embodiments of present disclosure will be described in detail in conjunction with accompanying drawings.

Figure 1:
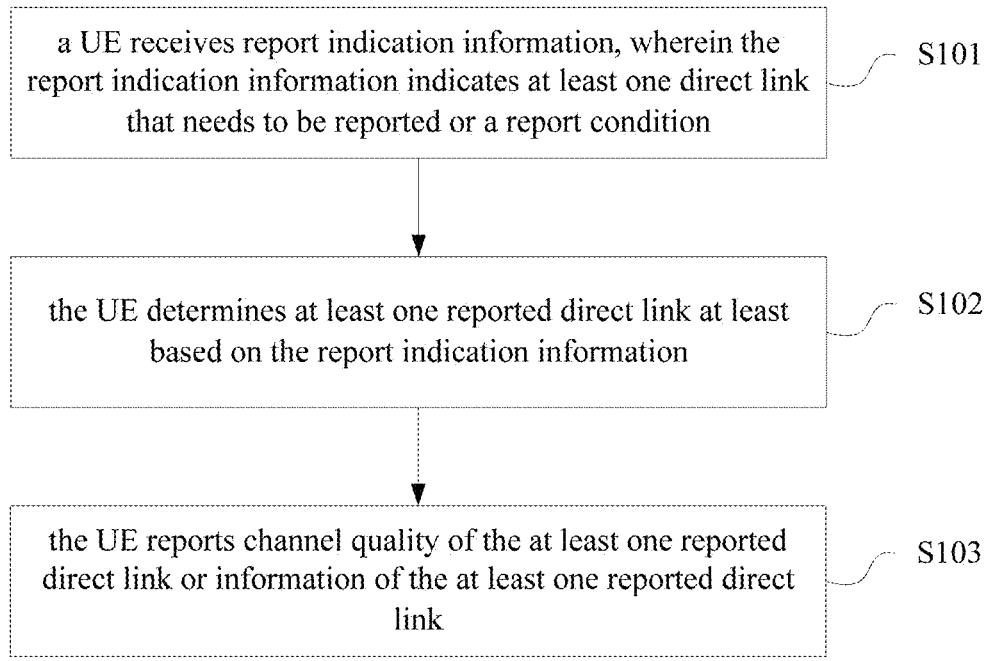
FIG. 1 is a flow chart of a channel quality reporting method for direct links according to an embodiment.

FIG. 1 is a flow chart of a channel quality reporting method for direct links according to an embodiment. The method may be applied to a UE side, for example, performed by a UE executing V2X transmission (i.e., a Tx UE).

Referring to FIG. 1, the method may include S101, S102 and S103.

In S101, a UE receives report indication information, wherein the report indication information indicates at least one direct link that needs to be reported or a report condition.

In S102, the UE determines at least one reported direct link at least based on the report indication information.

In S103, the UE reports channel quality of the at least one reported direct link or information of the at least one reported direct link.

It should be noted that sequence numbers of steps in the embodiment do not limit an execution order of the steps.

The UE (including a sending UE and a receiving UE) in the embodiment supports NR V2X services. The receiving UE refers to a UE that receives V2X data. The UE may be both a sending UE and a receiving UE. For example, two UEs perform bi-directional V2X data transmission, where each UE is both a sending UE and a receiving UE.

In a scenario, the Tx UE has established an RRC connection in a serving cell Cell1 (administered by a serving base station gNB1) to carry out data transmission services. The Tx UE may transmit V2X service to multiple receiving UEs (Rx UEs). For example, on frequency F1, the Tx UE transmits V2X service 1 to UE 1, transmits V2X service 2 and service 3 to UE 2, and transmits V2X service 4 to UE 3, where a direct link between the Tx UE and UE 1 is SL1 (that is, SL Index is 1), a direct link between the Tx UE and UE 2 is SL2, and a direct link between the Tx UE and UE 3 is SL3. On frequency F2, the Tx UE transmits V2X service 5 to UE 4, where a direct link between the Tx UE and UE 4 is SL4. The serving base station may configure the SL indexes corresponding to the direct links, or the Tx UE may indicate the SL indexes corresponding to the direct links to the serving base station. For example, the Tx UE may indicate the indexes of the direct links according to frequency and an identifier of Rx UE.

Identifiers of destination devices of different Rx UEs are different. UE1, UE2, UE3 and UE4 may be located within a coverage of Cell1, or within a coverage of neighboring cells, or out of coverage, that is, the serving cell cannot be detected. The Rx UE may be in an idle state or a connected state (the connected state is limited to being within the coverage of the cell).

In some embodiments, the Tx UE may detect a signal from the Rx UE, such as a demodulation reference signal, a synchronization signal or a specific reference signal contained therein, to evaluate channel quality of a direct link between the Tx UE and the Rx UE. For example, the channel quality may be represented by Channel Status Information (CSI). The Tx UE may acquire the SL CSI between the Tx UE and the Rx UE from the Rx UE which evaluates the channel quality of the direct link therebetween. The embodiments of the present disclosure are not limited thereto.

In some embodiments, CSI may include any combination of Channel Quality Indicator (CQI), Precoding Matrix Indicator (PMI), Rank indication (RI), and etc. For example, the CSI may include only CQI, or only CQI and RI. That is, the report indication information also includes configuration information of channel quality of the direct link, where the configuration information is selected from a group consisting of CQI, PMI and RI. The Tx UE learns specific content of the reported channel quality of the direct link based on the configuration information of channel quality of the direct link. The configuration information may be any one of CQI, PMI and RI of the direct link, or any combination thereof.

It should be noted that the report indication information may not include the configuration information of the channel quality of the direct link. In this case, a manner predefined in standards is adopted, for example, the Tx UE reports the CQI of the direct link, or the CQI and RI of the direct link.

The serving base station may configure and transmit the report indication information to the UE in advance. Specifically, the report indication information may be transmitted via RRC signaling or DCI.

In some embodiments, in S101, the UE may receive the report indication information from the base station. As the report indication information indicates at least one direct link that needs to be reported or a report condition, the UE determines the at least one direct link that needs to be reported or the report condition based on the report indication information.

In some embodiments, in S102, based on the report indication information indicating the at least one direct link that needs to be reported, the UE may determine the at least one reported direct link merely based on the report indication information. In the case where the report indication information indicates the report condition, the UE needs to combine the report indication information with other information of the UE's direct links, such as channel quality of the direct links, to determine the at least one reported direct link. Specifically, based on a direct link of the UE satisfying the report condition indicated by the report indication information, the direct link is determined as the reported direct link.

Further, in S103, the channel quality of the at least one reported direct link or the information of the at least one reported direct link is reported to the serving base station.

Specifically, an uplink resource may be used to report the channel quality of the at least one reported direct link or the information of the at least one reported direct link. The uplink resource may specifically be a Physical Uplink Shared Channel (PUSCH) or a Physical Uplink Control Channel (PUCCH). Specifically, the serving base station may use RRC signaling to configure a resource on the PUCCH or the PUSCH, so that the UE can report the channel quality of the at least one reported direct link or the information of the at least one reported direct link through the PUCCH resource or the PUSCH resource. The serving base station may use DCI signaling to configure a resource on the PUSCH, so that the UE can report the channel quality of the at least one reported direct link or the information of the at least one reported direct link through the PUSCH resource.

For the serving base station of the UE, the channel quality of the at least one reported direct link may be determined based on the channel quality or the information of the at least one reported direct link, so that transmission resources can be adaptively allocated for the at least one reported direct link, to ensure transmission efficiency of V2X data on the at least one reported direct link.

In the embodiments of the present disclosure, the UE may determine the at least one reported direct link based on the report indication information configured by the base station, and report the channel quality of the at least one reported direct link or the information of the at least one reported direct link. In this manner, the base station determines the channel quality of the at least one reported direct link of the UE based on the channel quality or the information of the at least one reported direct link. By embodiments of the present disclosure, channel quality of direct links may be reported by the UE effectively.

Figure 2:
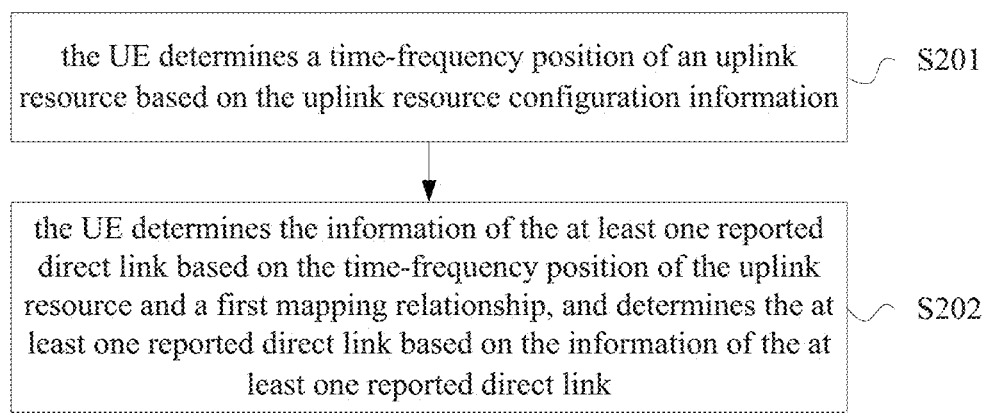
FIG. 2 is a flow chart of S102 as shown in FIG. 1 according to an embodiment.

In some embodiments, the report indication information includes uplink resource configuration information. Referring to FIG. 2, S102 as shown in FIG. 1 may include S201 and S202.

In S201, the UE determines a time-frequency position of an uplink resource based on the uplink resource configuration information.

In S202, the UE determines the information of the at least one reported direct link based on the time-frequency position of the uplink resource and a first mapping relationship, and determines the at least one reported direct link based on the information of the at least one reported direct link.

In some embodiments, the first mapping relationship includes correspondence between time-frequency positions of a plurality of uplink resources and information of a plurality of direct links, and the time-frequency position of one uplink resource corresponds to the information of at least one direct link. That is, the time-frequency position of one uplink resource corresponds to information of one direct link, or information of multiple direct links. Accordingly, the channel quality of one direct link or the channel quality of multiple direct links are reported by using the one uplink resource. Specifically, the information of the direct link may be a destination device identifier of the direct link, or an index of the direct link (SL Index), or a transmission frequency and the destination device identifier. Accordingly, the first mapping relationship may include correspondence between time-frequency positions of uplink resources and destination device identifiers, or include correspondence between time-frequency positions of uplink resources and indexes of direct links, or include correspondence between combinations of transmission frequencies and destination device identifiers and time-frequency positions of uplink resources.

It should be noted that the first mapping relationship may be transmitted by the base station to the UE in advance.

In some embodiments, the information of the direct link may point to the direct link. For example, the information of the direct link may be a destination device identifier of the direct link, or an index of the direct link (SL Index), or a transmission frequency and the destination device identifier. Therefore, the UE determines the time-frequency position of the uplink resource after receiving the uplink resource configuration information configured by the base station, searches in the first mapping relationship based on the time-frequency position of the uplink resource to determine the information of the at least one direct link corresponding to the time-frequency position of the uplink resource, and further determines the at least one reported direct link based on the information of the at least one direct link.

Further, S103 as shown in FIG. 1 may include reporting the channel quality of the at least one reported direct link using at least the uplink resource.

The base station may determine the information of the direct link based on the time-frequency position of the uplink resource where the received channel quality is located and the first mapping relationship, and further determine the direct link based on the information of the direct link, so as to better configure transmission resources for the direct link.

In some embodiments, the report indication information further includes a channel quality threshold, and said reporting the channel quality of the at least one reported direct link using at least the uplink resource includes: reporting the channel quality of the at least one reported direct link using the uplink resource, based on the channel quality of the at least one reported direct link reaching the channel quality threshold. In other words, the Tx UE may not use the uplink resource configured by the serving base station, and merely uses the uplink resource corresponding to the direct link to report CSI of the direct link based on the quality of the direct link being greater than the channel quality threshold.

It should be noted that the channel quality threshold may be adaptively configured by the serving base station based on actual application environment, or may be stipulated in a communication standard, which is not limited in the embodiments of the present disclosure.

In some embodiments, the information of the direct link includes a destination device identifier, and S202 as shown in FIG. 2 includes: determining a direct link between a current UE and a destination device indicated by the destination device identifier as the at least one reported direct link, based on the current UE sending V2X data on a single frequency.

In the embodiments, the Tx UE may transmit V2X data to the Rx UE on one frequency. Accordingly, the serving base station merely needs to configure the destination device identifier when configuring the information of the direct link.

In some embodiments, the information of the direct link includes a transmission frequency and a destination device identifier, and S202 as shown in FIG. 2 includes: determining a direct link on the transmission frequency between the current UE and a destination device indicated by the destination device identifier as the at least one reported direct link, based on the current UE sending V2X data on a plurality of frequencies.

Differences from the above embodiments lie in that the UE in the embodiments transmits V2X data to a same UE on different frequencies. In this case, when configuring the information of the direct link, the serving base station needs to configure the destination device identifier and the transmission frequency, or uses SL Index to indicate the direct link.

In an application scenario, to enable the Tx UE to know which direct link's channel quality needs to be reported, the serving base station may configure the correspondence between a combination of the transmission frequency and the destination device identifier and a PUCCH resource, or configure the correspondence between an SL Index and a PUCCH resource, i.e., the first mapping relationship, so that the UE feeds back the corresponding SL CQI on the corresponding PUCCH resource. For example, PUCCH resource 1 (a time-frequency position 1 where PUCCH is located) corresponds to a transmission frequency F1 and UE 1, and a direct link between the Tx UE and UE 1 on the transmission frequency F1 is SL1; PUCCH resource 2 corresponds to the transmission frequency F1 and UE 2, and a direct link between the Tx UE and UE 2 on the transmission frequency F1 is SL2; and PUCCH resource 3 corresponds to a transmission frequency F2 and UE 4, and a direct link between the Tx UE and UE 4 on the transmission frequency F2 is SL4.

Therefore, after determining the time-frequency position of PUCCH resource 1, the Tx UE may determine that the direct link reported on the resource is SL1, and report CQI of the direct link SL1 on PUCCH resource 1. Similarly, the Tx UE may report CQI of the direct link SL2 on PUCCH resource 2, and report CQI of the direct link SL4 on PUCCH resource 3.

In some embodiments, the information of the direct link includes an index of the direct link, and S202 as shown in FIG. 2 includes: determining the at least one reported direct link based on a second mapping relationship and the index of the at least one direct link, wherein the second mapping relationship includes correspondence between the plurality of direct links and indexes of the plurality of direct links.

Figure 3:
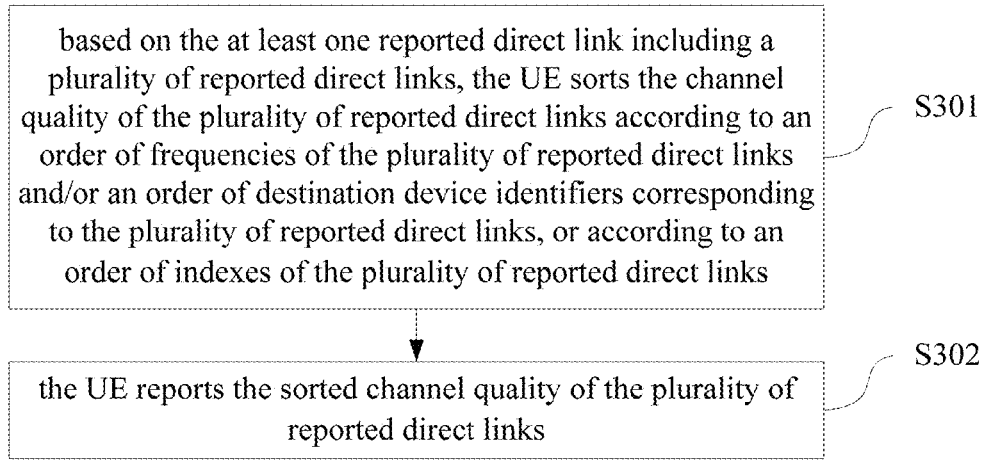
FIG. 3 is a flow chart of S103 as shown in FIG. 1 according to an embodiment.

Referring to FIG. 3, in some embodiments, S103 as shown in FIG. 1 may include S301 and S302.

In S301, based on the at least one reported direct link including a plurality of reported direct links, the UE sorts the channel quality of the plurality of reported direct links according to an order of frequencies of the plurality of reported direct links and/or an order of destination device identifiers corresponding to the plurality of reported direct links, or according to an order of indexes of the plurality of reported direct links.

In S302, the UE reports the sorted channel quality of the plurality of reported direct links.

In the above embodiments, the channel quality of different direct links is reported using different uplink resources. In the embodiments, the channel quality of different direct links is reported using the same uplink resource.

In some embodiments, when reporting the channel quality CSI of the direct link on the uplink resource such as the PUSCH, the UE may transmit the CSI using some Resource Elements (REs) on the PUSCH time-frequency resource, or using all available REs on the PUSCH time-frequency resource. The CSI may be coded in layer 2 and then transmitted via PUSCH.

In some embodiments, the report indication information includes a plurality of destination device identifiers, or includes a plurality of transmission frequencies and a plurality of destination device identifiers, or includes indexes of a plurality of direct links. The UE may determine the plurality of reported direct links based on the report indication information.

In some embodiments, based on a current UE sending V2X data on a single frequency, the current UE may determine a plurality of reported direct links based on a plurality of destination device identifiers. Based on the current UE sending V2X data on a plurality of frequencies, the current UE may determine direct links on the transmission frequencies between the current UE and a destination device indicated by the destination device identifier as the plurality of reported direct links. The UE may determine the plurality of reported direct links based on the second mapping relationship and the indexes of the plurality of direct links, where the second mapping relationship includes the indexes of the plurality of direct links and the corresponding plurality of direct links.

In some embodiments, after determining the plurality of reported direct links, the UE may arrange combined report of the channel quality based on the transmission frequencies of the direct links from low to high and the destination device identifiers of the direct links from small to large. For example, if the serving base station requires the Tx UE to report CSI of all direct links, the UE may first arrange the CSI of different direct links on the transmission frequency F1 (each CSI occupies a fixed number of bits, such as 4 bits), and then arrange the CSI of different direct links on the transmission frequency F2. For the transmission frequency F1, the CSI may be sorted based on the destination device identifiers from small to large, or based on other rules, such as the above indexes of direct links SL1, SL2 and SL3.

The serving base station may configure that the UE reports the channel quality of a portion of direct links such as SL1 and SL2, and accordingly the serving base station allocates PUSCH resources suitable for a CSI data size of the two direct links, to facilitate the Tx UE reporting the channel quality of the two links. After receiving the CSI of the direct links reported by the UE, the serving base station parses to acquire the CSI of different direct links in a same order.

In some embodiments, based on the report indication information is the report condition, S102 as shown in FIG. 1 may include determining the at least one reported direct link based on the channel quality of the at least one reported direct link reaching the channel quality threshold. In this case, the report condition is the channel quality threshold or a channel quality interval.

In some embodiments, the direct link whose channel quality reaches the channel quality threshold may have higher applicable modulation and coding parameters. In this case, the report condition may be set to a high CQI threshold, and information of direct links below the threshold does not need to be reported, merely the information of direct links above the CQI threshold is reported. The modulation and coding parameters may be a Modulation Coding Scheme (MCS) which may specifically be Quadrature Phase Shift Keying (QPSK), 16 Quadrature Amplitude Modulation (Quadrature Amplitude Modulation), 64QAM, etc.

In some embodiments, the channel quality threshold may be set according to the transmission frequency, that is, different channel quality thresholds are applicable to direct links on different transmission frequencies. Specifically, the base station may configure multiple channel quality thresholds so that the UE can report the channel quality of direct links in different intervals.

In some embodiments, the serving base station may merely configure a low CQI threshold (that is, the report condition is the low CQI threshold), so that the UE reports information or channel quality of direct links below the threshold, while information or channel quality of direct links above the threshold does not need to be reported. For the direct link, the base station may configure a transmission resource using lowest modulation and demodulation parameters, or request the UE to terminate V2X data transmission of the direct link. For direct links that do not meet the threshold, the serving base station may allocate for the Tx UE transmission resources using a high-order modulation and coding scheme.

Further, S103 as shown in FIG. 1 may include: reporting an index or a number of the at least one reported direct link; based on a current UE sending V2X data on a single frequency, reporting the number of the at least one reported direct link or a destination device identifier of the at least one reported direct link; or based on the current UE sending V2X data on a plurality of frequencies, reporting the number of the at least one reported direct link or a destination device identifier of the at least one reported direct link on each of the plurality of frequencies.

In the embodiments, the direct link whose channel quality reaches the channel quality threshold may be applied to other modulation and coding parameters other than general modulation and coding parameters (the channel quality threshold is a high CQI threshold in this case, and the Tx UE merely reports the information of direct links above the threshold). Therefore, the UE may merely report the number of reported direct links, so that the base station can separately allocate for the direct links reporting channel quality transmission resources with higher modulation and coding parameters, for example, with high-order modulation, to achieve higher transmission efficiency. For direct links whose channel quality is not reported, the base station may configure transmission resources based on the general modulation and coding parameters.

In an application scenario, the Tx UE performs V2X transmission using the 16QAM modulation and coding mode by default. Low-order modulation can adapt to poor channel conditions, but spectrum efficiency is not high. In this case, the base station merely needs to know which direct links are suitable for high-order modulation. Therefore, the base station may configure a CQI threshold, and the UE merely reports channel quality of direct links higher than the threshold, or merely reports the direct links without reporting specific signal quality, or merely reports a number of direct links meeting the threshold.

If the Tx UE transmits V2X data merely on one frequency, the Tx UE may merely report a number of direct links exceeding the threshold; if the Tx UE transmits V2X data on multiple frequencies, the Tx UE may report the number of direct links exceeding the threshold on each frequency. After receiving the number of direct links exceeding the threshold, the base station may reasonably schedule a number of SL Grants for high-order modulation to enable direct links of the Tx UE with better channel conditions to apply transmission resources with high-order modulation.

In an embodiment of the present disclosure, another channel quality reporting method for direct links is provided. The method may be applied to a base station side, for example, performed by a base station. The method may include: configuring report indication information, wherein the report indication information indicates at least one direct link that needs to be reported or a report condition; and transmitting the report indication information to a UE, so that the UE determines at least one reported direct link at least based on the report indication information, and reports channel quality of the at least one reported direct link or information of the at least one reported direct link.

More details of the method can be found in the above descriptions of FIG. 1 to FIG. 3, and are not described here.

Figure 4:
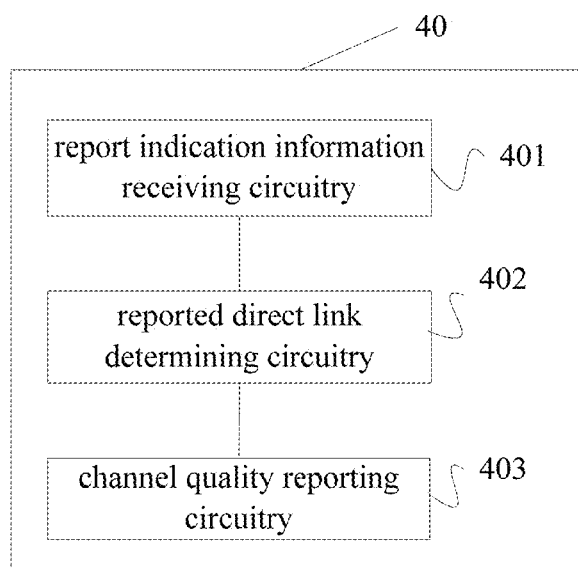
FIG. 4 is a structural diagram of a channel quality reporting apparatus for direct links according to an embodiment.

In an embodiment of the present disclosure, a channel quality reporting apparatus for direct links is provided. Referring to FIG. 4, the channel quality reporting apparatus 40 for direct links may include a report indication information receiving circuitry 401, a reported direct link determining circuitry 402 and a channel quality reporting circuitry 403.

The report indication information receiving circuitry 401 is configured to receive report indication information, wherein the report indication information indicates at least one direct link that needs to be reported or a report condition; the reported direct link determining circuitry 402 is configured to determine at least one reported direct link at least based on the report indication information; and the channel quality reporting circuitry 403 is configured to report channel quality of the at least one reported direct link or information of the at least one reported direct link.

By embodiments of the present disclosure, channel quality of direct links may be reported effectively.

More details of working principles and working modes of the channel quality reporting apparatus 40 can be found in the above descriptions of FIG. 1 to FIG. 3, and are not described here.

In an embodiment of the present disclosure, a storage medium having computer instructions stored therein is provided, wherein when the computer instructions are executed, the above method as shown in FIGS. 1 to 3 is performed. The storage medium may include a Read Only Memory (ROM), a Random Access Memory (RAM), a magnetic disk or an optical disk. In some embodiments, the storage medium may include a non-volatile memory or a non-transitory memory.

In an embodiment of the present disclosure, a UE including a memory and a processor is provided, wherein the memory has computer instructions stored therein, and when the processor executes the computer instructions, the above method as shown in FIGS. 1 to 3 is performed. In some embodiments, the UE includes but is not limited to mobile phone, computer or tablet.

In an embodiment of the present disclosure, a base station including a memory and a processor is provided, wherein the memory has computer instructions stored therein, and when the processor executes the computer instructions, the above method is performed.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A channel quality reporting method for direct links, comprising:
   receiving report indication information, wherein the report indication information indicates at least one direct link that needs to be reported or a report condition;
   determining at least one reported direct link at least based on the report indication information;
   reporting channel quality of the at least one reported direct link or information of the at least one reported direct link; and
   wherein the report condition comprises a channel quality threshold, and said determining at least one reported direct link at least based on the report indication information comprises:
   determining the at least one reported direct link based on the channel quality of the at least one reported direct link reaching the channel quality threshold.

2. The method according to claim 1, wherein the report indication information comprises uplink resource configuration information;
   said determining at least one reported direct link at least based on the report indication information comprises: determining a time-frequency position of an uplink resource based on the uplink resource configuration information; and determining the information of the at least one reported direct link based on the time-frequency position of the uplink resource and a first mapping relationship, and determining the at least one reported direct link based on the information of the at least one reported direct link, wherein the first mapping relationship comprises correspondence between time-frequency positions of a plurality of uplink resources and information of a plurality of direct links, and the time-frequency position of one uplink resource corresponds to the information of at least one direct link; and
   said reporting channel quality of the at least one reported direct link or information of the at least one reported direct link comprises reporting the channel quality of the at least one reported direct link using at least the uplink resource.

3. The method according to claim 2, wherein the information of the direct link comprises a destination device identifier, and said determining the at least one reported direct link based on the information of the at least one reported direct link comprises:
   determining a direct link between a current User Equipment (UE) and a destination device indicated by the destination device identifier as the at least one reported direct link, based on the current UE sending V2X data on a single frequency.

4. The method according to claim 2, wherein the information of the direct link comprises a transmission frequency and a destination device identifier, and said determining the at least one reported direct link based on the information of the at least one reported direct link comprises:

determining a direct link on the transmission frequency between the current UE and a destination device indicated by the destination device identifier as the at least one reported direct link, based on the current UE sending V2X data on a plurality of frequencies.

5. The method according to claim 2, wherein the information of the direct link comprises an index of the direct link, and said determining the at least one reported direct link based on the information of the at least one reported direct link comprises:
determining the at least one reported direct link based on a second mapping relationship and the index of the at least one direct link, wherein the second mapping relationship comprises correspondence between the plurality of direct links and indexes of the plurality of direct links.

6. The method according to claim 2, wherein said reporting the channel quality of the at least one reported direct link using at least the uplink resource comprises:
reporting the channel quality of the at least one reported direct link using the uplink resource, based on the channel quality of the at least one reported direct link reaching the channel quality threshold.

7. The method according to claim 1, wherein said reporting channel quality of the at least one reported direct link or information of the at least one reported direct link comprises:
based on the at least one reported direct link comprising a plurality of reported direct links, sorting the channel quality of the plurality of reported direct links according to an order of frequencies of the plurality of reported direct links and/or an order of destination device identifiers corresponding to the plurality of reported direct links, or according to an order of indexes of the plurality of reported direct links; and
reporting the sorted channel quality of the plurality of reported direct links.

8. The method according to claim 7, wherein the report indication information comprises a plurality of destination device identifiers, or comprises a plurality of transmission frequencies and a plurality of destination device identifiers, or comprises indexes of a plurality of direct links.

9. The method according to claim 1, wherein said reporting channel quality of the at least one reported direct link or information of the at least one reported direct link comprises:
reporting an index or a number of the at least one reported direct link;
based on a current UE sending V2X data on a single frequency, reporting the number of the at least one reported direct link or a destination device identifier of the at least one reported direct link; or
based on the current UE sending V2X data on a plurality of frequencies, reporting the number of the at least one reported direct link or a destination device identifier of the at least one reported direct link on each of the plurality of frequencies.

10. The method according to claim 1, wherein the report indication information further comprises configuration information of channel quality of the direct link, and the configuration information is selected from a group consisting of a channel quality indicator, a precoding matrix indicator and a rank indicator of the direct link.

11. A channel quality reporting method for direct links, comprising:
configuring report indication information, wherein the report indication information indicates at least one direct link that needs to be reported or a report condition;
transmitting the report indication information to a User Equipment (UE) to make the UE determine at least one reported direct link at least based on the report indication information, and report channel quality of the at least one reported direct link or information of the at least one reported direct link; and
wherein the report condition comprises a channel quality threshold, and said determining at least one reported direct link at least based on the report indication information comprises:
determining the at least one reported direct link based on the channel quality of the at least one reported direct link reaching the channel quality threshold.

12. A non-transitory storage medium storing one or more programs, the one or more programs comprising computer instructions, which, when executed by a processor, cause the processor to:
receive report indication information, wherein the report indication information indicates at least one direct link that needs to be reported or a report condition;
determine at least one reported direct link at least based on the report indication information;
report channel quality of the at least one reported direct link or information of the at least one reported direct link; and
wherein the report condition comprises a channel quality threshold, and said determining at least one reported direct link at least based on the report indication information comprises:
determining the at least one reported direct link based on the channel quality of the at least one reported direct link reaching the channel quality threshold.

13. The non-transitory storage medium according to claim 12, wherein the report indication information comprises uplink resource configuration information;
said determining at least one reported direct link at least based on the report indication information comprises: determining a time-frequency position of an uplink resource based on the uplink resource configuration information; and determining the information of the at least one reported direct link based on the time-frequency position of the uplink resource and a first mapping relationship, and determining the at least one reported direct link based on the information of the at least one reported direct link, wherein the first mapping relationship comprises correspondence between time-frequency positions of a plurality of uplink resources and information of a plurality of direct links, and the time-frequency position of one uplink resource corresponds to the information of at least one direct link; and
said reporting channel quality of the at least one reported direct link or information of the at least one reported direct link comprises reporting the channel quality of the at least one reported direct link using at least the uplink resource.

14. The non-transitory storage medium according to claim 13, wherein the information of the direct link comprises a destination device identifier, and said determining the at least one reported direct link based on the information of the at least one reported direct link comprises:
determining a direct link between a current User Equipment (UE) and a destination device indicated by the destination device identifier as the at least one reported direct link, based on the current UE sending V2X data on a single frequency.

15. The non-transitory storage medium according to claim 13, wherein the information of the direct link comprises a transmission frequency and a destination device identifier, and said determining the at least one reported direct link based on the information of the at least one reported direct link comprises:
  determining a direct link on the transmission frequency between the current UE and a destination device indicated by the destination device identifier as the at least one reported direct link, based on the current UE sending V2X data on a plurality of frequencies.

16. The non-transitory storage medium according to claim 13, wherein the information of the direct link comprises an index of the direct link, and said determining the at least one reported direct link based on the information of the at least one reported direct link comprises:
  determining the at least one reported direct link based on a second mapping relationship and the index of the at least one direct link, wherein the second mapping relationship comprises correspondence between the plurality of direct links and indexes of the plurality of direct links.

17. The non-transitory storage medium according to claim 13, wherein said reporting the channel quality of the at least one reported direct link using at least the uplink resource comprises:
  reporting the channel quality of the at least one reported direct link using the uplink resource, based on the channel quality of the at least one reported direct link reaching the channel quality threshold.

18. The non-transitory storage medium according to claim 12, wherein said reporting channel quality of the at least one reported direct link or information of the at least one reported direct link comprises:
  based on the at least one reported direct link comprising a plurality of reported direct links, sorting the channel quality of the plurality of reported direct links according to an order of frequencies of the plurality of reported direct links and/or an order of destination device identifiers corresponding to the plurality of reported direct links, or according to an order of indexes of the plurality of reported direct links; and
  reporting the sorted channel quality of the plurality of reported direct links.

* * * * *